A. G. WEIER.
ATTACHMENT FOR SAUSAGE MACHINES.
APPLICATION FILED APR. 5, 1912.
1,087,856.
Patented Feb. 17, 1914.
2 SHEETS—SHEET 2.
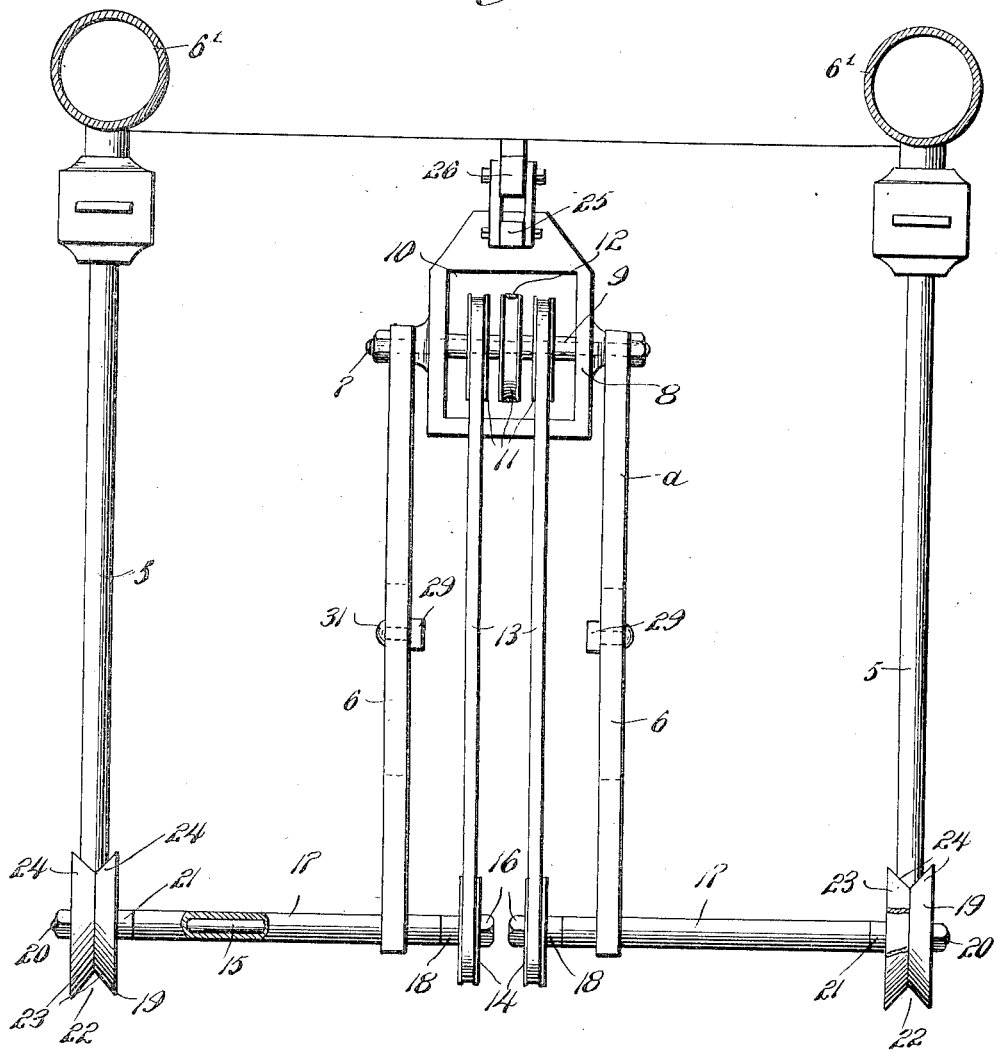

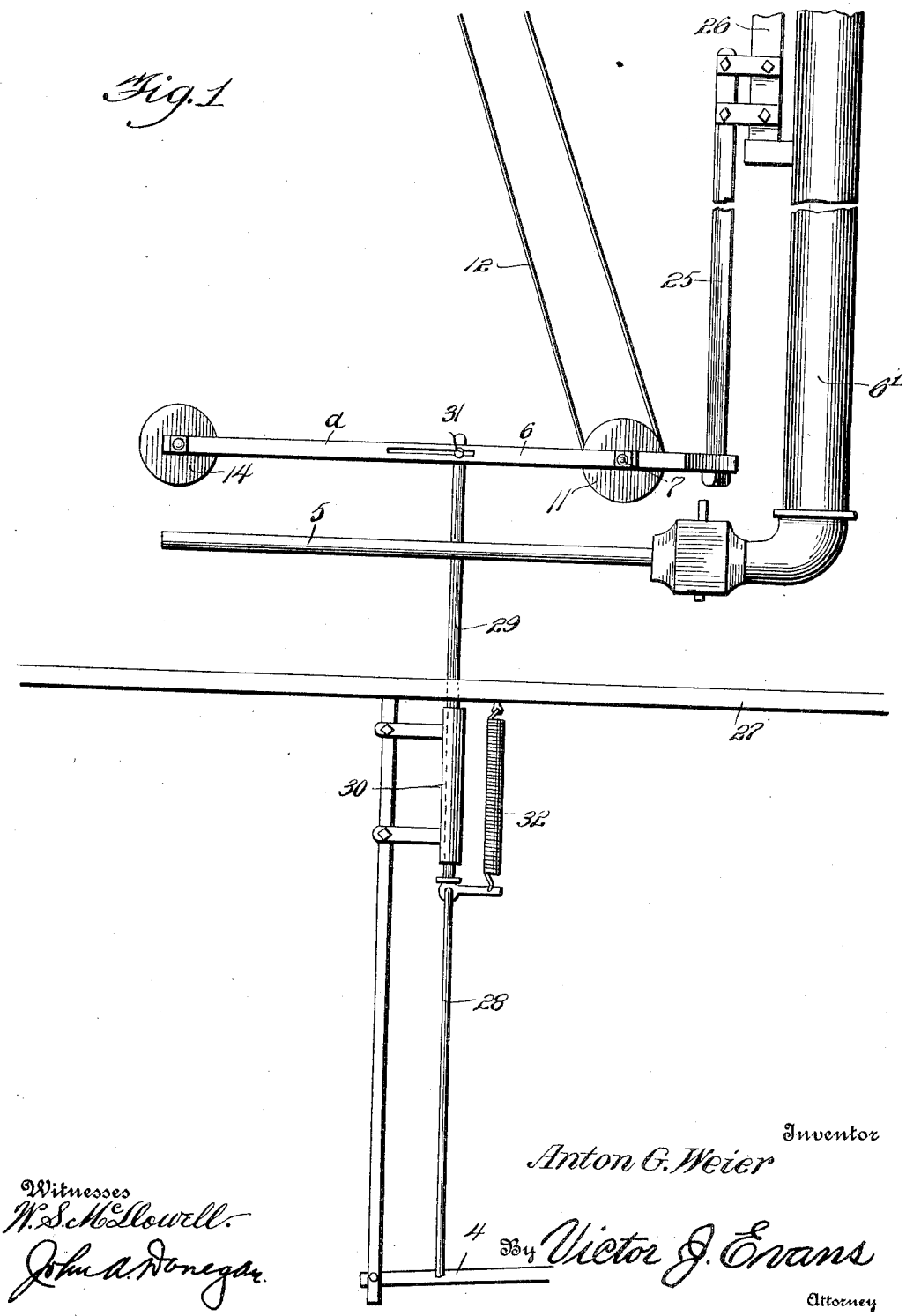

UNITED STATES PATENT OFFICE.

ANTON G. WEIER, OF CHICAGO, ILLINOIS.

ATTACHMENT FOR SAUSAGE-MACHINES.

1,087,856.  Specification of Letters Patent.  Patented Feb. 17, 1914.

Application filed April 5, 1912. Serial No. 688,694.

*To all whom it may concern:*

Be it known that I, ANTON G. WEIER, a citizen of the United States, residing at Chicago, in the county of Cook and State of Illinois, have invented new and useful Improvements in Attachments for Sausage-Machines, of which the following is a specification.

The object of the invention is to facilitate and expedite the operation of arranging casings on the filling tubes of sausage machines.

Other objects will appear and be better understood from the following description taken in connection with the accompanying drawings, in which, Figure 1 is a side elevation of the device partly in section applied to the sausage machine. Fig. 2 is a plan partly in section, showing the relative positions of the feed tubes and means for forcing the casings thereonto.

The feed tubes 5—5 form extensions of the casings 6' from which the sausage meat is forced into the tubes in any preferred manner.

The device about to be described is shown in connection with a portion of a sausage machine provided with two feed tubes as previously indicated by 5—5. It will be understood, however, that this particular showing is merely descriptive of one embodiment of the invention and it will be readily understood, from what will hereinafter appear, that the device may, within the limits of the claim, be constructed so as to operate with a greater or less number of tubes than shown.

The sides 6—6 of a swinging frame *a* pivot at one end on a spindle 7 which extends through a bracket 8 and through a sleeve 9 arranged in a hole 10 in the bracket and to which are secured a plurality of pulleys 11. One of the pulleys 11 is connected in any preferred manner such as by a belt 12, to a suitable source of power (not shown) and the other pulleys are connected in any preferred manner such as by belts 13—13, with pulleys 14—14 suitably secured to shafts 15—15 and suitably retained thereon by nuts 16—16 and held spaced from the ends of the bearing sleeves 17—17 through which the shafts 15—15 extend, by bushings 18—18.

The devices for slipping the casings onto the tubes 5—5 are actuated by the shafts 15—15 to which they may be connected, or secured in any preferred or mechanical manner. These devices frictionally engage the casings after the ends of the same are slipped over the end portions of the tubes and by their action and their contact with the casings feed the same onto the tubes, causing relatively long casings to become effectively packed or stowed onto the tubes. The said devices may be of any construction found suitable for the purpose previously stated. In practice I have attained good results with a pair of wheels 19—19 suitably secured to the shafts 15—15 and suitably held against displacement thereon as by nuts 20—20 and maintained against contact with the ends of the sleeves 17—17 by bushings 21—21. The peripheries of the wheels are adapted to embrace the tubes 5—5 and for this purpose the wheels are constructed so that their peripheries have continuous spaces 22—22 for the tubes and to insure against the peripheries slipping on the casings I face the peripheries with any suitable material such as canvas 23. Each of the wheels 19 is preferably, though not necessarily, of wood and each wheel may be formed of one piece or made up of the opposed frusto-conical sections 24—24. Normally, the feed devices for the casings are spaced from the tubes 5—5 as shown in Fig. 1, but the swinging frame by which they are supported, may be swung downwardly through suitable instrumentalities hereinafter described, so that the spaces or grooves 22—22 will receive the end portions of the tubes 5—5.

The bracket 8 may be connected either directly to any convenient portion of the sausage machines, or any other suitable support such as one section of an extensible hanger 25, the other section 26 of which is suitably connected to the casing 6 or other convenient part of the sausage machine, or any other suitable supporting means.

For imparting swinging movement to the frame previously mentioned, I preferably make use of a treadle motion which may be suitably constructed and connected to any suitable support and to the swinging frame. An efficient treadle motion is shown in the drawings, where 4 indicates the tread board which is pivotally connected to the table 27 and connected by a strap 28 to one end of a connecting rod 29 which is guided by a sleeve 30 and which is connected by pin and slot connections 31 with one side of the swinging frame.

32 indicates a retractile spring connected to the connecting rod 29 and to the table 27 and which serves to pull the connecting rod upwardly and likewise the tread board 4 after foot pressure is removed therefrom. This will have the effect of automatically restoring the feed devices to their normal positions above the tubes when the foot is removed from the tread board.

From the foregoing it will have been observed that the device is exceedingly simple in construction and comparatively inexpensive to manufacture and reduces to a minimum the time heretofore required to slip a casing onto a feed tube.

What I claim as new is:

The combination with a feed tube of a sausage machine of a frame, a shaft mounted in said frame, a lever pivotally supported on said shaft beyond the frame and normally extending in parallelism with the feed tube, an arm supported at the end of the lever and having one end overlying the tube, a shaft rotatably supported in the arm, a wheel carried by one end of the shaft, means carried by the opposite end of the shaft to operatively engage the feed tube, a drive wheel mounted on the shaft within the frame, a belt connecting said wheels, a power wheel connected with a suitable source of power and mounted on the shaft adjacent the drive wheel, and means connected to the lever intermediate the shaft and arm to move said arm to and from the feed tube.

In testimony whereof I affix my signature in presence of two witnesses.

ANTON G. WEIER.

Witnesses:
  JACOB WEIER,
  HERMAN STEGMAN.

---

Copies of this patent may be obtained for five cents each, by addressing the " Commissioner of Patents, Washington, D. C."